United States Patent
Engelbrecht et al.

(10) Patent No.: US 9,131,674 B2
(45) Date of Patent: Sep. 15, 2015

(54) TRAILED AGRICULTURAL IMPLEMENT PUMP WITH HYDRAULIC FLOW RATE CONTROL

(71) Applicants: Deere & Company, Moline, IL (US); JOHN DEERE FABRIEK HORST B.V., Horst (NL)

(72) Inventors: Joshua J. Engelbrecht, Ankeny, IA (US); Michael L. Gardner, Ankeny, IA (US); Peter Hloben, Krefeld (DE)

(73) Assignee: DEERE & COMPANY, Moline, IL (US)

( * ) Notice: Subject to any disclaimer, the term of this patent is extended or adjusted under 35 U.S.C. 154(b) by 540 days.

(21) Appl. No.: 13/630,478

(22) Filed: Sep. 28, 2012

(65) Prior Publication Data

US 2014/0093397 A1 Apr. 3, 2014

(51) Int. Cl.
*F16D 31/02* (2006.01)
*A01M 7/00* (2006.01)

(52) U.S. Cl.
CPC .................................. *A01M 7/0089* (2013.01)

(58) Field of Classification Search
CPC ....... A01M 7/0089; B05B 9/049; B05B 9/06; F04D 13/04; F04D 13/043; F04D 13/046
See application file for complete search history.

(56) References Cited

U.S. PATENT DOCUMENTS

| 3,845,777 A | 11/1974 | Gilson |
| 5,447,274 A | 9/1995 | Tofin et al. |
| 7,866,150 B2 | 1/2011 | Harber et al. |
| 7,954,513 B2 * | 6/2011 | Engelbrecht et al. ..... 137/625.47 |
| 8,191,798 B2 * | 6/2012 | Hahn et al. .................... 239/157 |

FOREIGN PATENT DOCUMENTS

| GB | 605407 | 7/1948 |
| GB | 723729 | 2/1955 |
| GB | 821564 | 10/1959 |

OTHER PUBLICATIONS

Using Load-Sensng Hydraulic System (Power Beyond). [retrieved on Sep. 12, 2012]. Retrieved from the internet: <URL: http://manuals.deere.com/omview/OMAR232106_19/OU1092A_000005C_19_12DEC05_1.htm>.

* cited by examiner

*Primary Examiner* — Michael Leslie

(57) ABSTRACT

A trailed agricultural implement is disclosed. The trailed agricultural implement includes a hydraulically-driven pump for moving a fluid at an actual fluid rate. An electro-hydraulic valve is configured to regulate an implement hydraulic pressure to the hydraulically-driven pump. The hydraulically-driven pump regulates the actual fluid rate. The electro-hydraulic valve is configured to receive a vehicle hydraulic pressure. The electro-hydraulic valve communicates with a vehicle load sense system. The load sense system senses the implement hydraulic pressure and communicates with a vehicle hydraulic pump. The vehicle hydraulic pump adjusts the vehicle hydraulic pressure to correspond to the implement hydraulic pressure.

20 Claims, 2 Drawing Sheets

TRAILED AGRICULTURAL IMPLEMENT PUMP WITH HYDRAULIC FLOW RATE CONTROL

FIELD OF THE DISCLOSURE

The present disclosure generally relates to trailed agricultural implements, and more particularly to a pump with hydraulic flow rate control for trailed agricultural implements.

BACKGROUND OF THE DISCLOSURE

In order to spray a fluid (e.g., fertilizer, pesticide, fungicide, insecticide) onto agricultural crops, agricultural sprayers commonly include a PTO-driven diaphragm pump. A fluid regulation valve is commonly used to control fluid flow.

SUMMARY OF THE DISCLOSURE

In one embodiment, a trailed agricultural sprayer is disclosed. The trailed agricultural sprayer includes a hydraulically-driven pump for moving a fluid at an actual fluid rate. The hydraulically-driven pump regulates the actual fluid rate. An electro-hydraulic valve is configured to regulate an implement hydraulic pressure to the hydraulically-driven pump. The electro-hydraulic valve is configured to receive a vehicle hydraulic pressure. The electro-hydraulic valve communicates with a vehicle load sense system. The load sense system senses the implement hydraulic pressure and communicates with a vehicle hydraulic pump. The vehicle hydraulic pump adjusts the vehicle hydraulic pressure to correspond to the implement hydraulic pressure. Additional details for the load sense system are defined in ISO 17567, which is hereby incorporated by reference.

In another embodiment, a trailed agricultural implement is disclosed. The trailed agricultural implement includes a hydraulically-driven pump for moving a fluid at an actual fluid rate. The hydraulically-driven pump regulates the actual fluid rate. An electro-hydraulic valve is configured to regulate an implement hydraulic pressure to the hydraulically-driven pump. The electro-hydraulic valve is configured to receive a vehicle hydraulic pressure. The electro-hydraulic valve communicates with a vehicle load sense system. The load sense system senses the implement hydraulic pressure and communicates with a vehicle hydraulic pump. The vehicle hydraulic pump adjusts the vehicle hydraulic pressure to correspond to the implement hydraulic pressure.

In yet another embodiment, a method for operating a hydraulically-driven pump to move a fluid on trailed agricultural implement is disclosed. The method includes receiving a desired fluid rate. The method includes determining an actual fluid rate. The method includes receiving a vehicle hydraulic pressure. The method includes regulating the vehicle hydraulic pressure to an implement hydraulic pressure provided to the hydraulically-driven pump to adjust the actual fluid rate to correspond to the desired fluid rate. The method includes communicating the implement hydraulic pressure to a vehicle load sense system. The vehicle load sense system communicates with a vehicle hydraulic pump. The vehicle hydraulic pump adjusts the vehicle hydraulic pressure to correspond to the implement hydraulic pressure.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION

Figure 1:
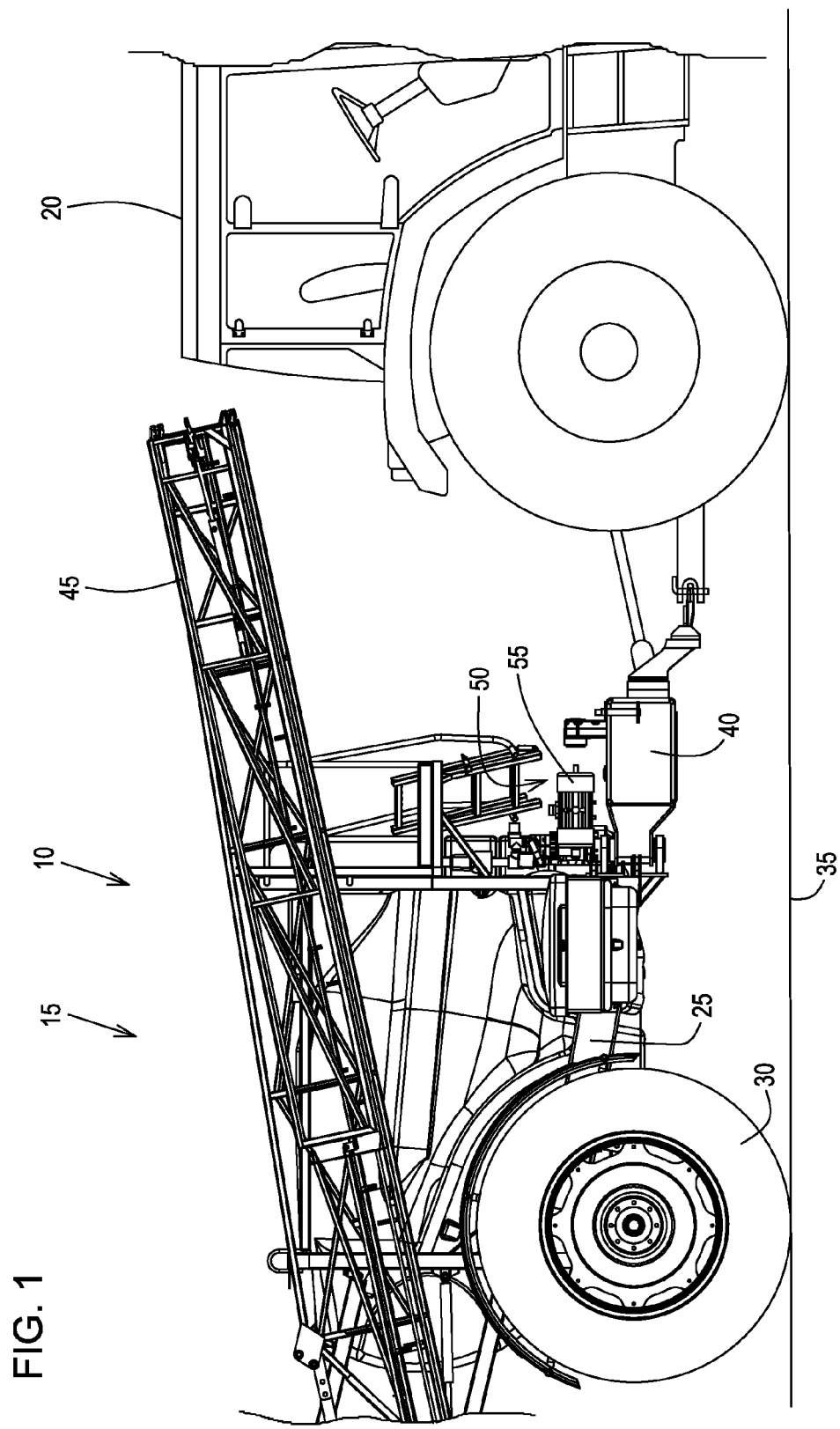
FIG. 1 is perspective view of a trailed agricultural implement according to one embodiment.

FIG. 1 illustrates a trailed agricultural implement 10. The illustrated trailed agricultural implement 10 is a trailed agricultural sprayer 15. Other types of trailed agricultural implements 10 are contemplated by this disclosure. The trailed agricultural sprayer 15 is pulled by a vehicle 20.

With continued reference to FIG. 1, the trailed agricultural sprayer 15 includes a frame 25. A plurality of wheel assemblies 30 are coupleable to the frame 25 to support the frame 25 above a surface 35. A coupling mechanism 40 is coupleable to the frame 25 for coupling the trailed agricultural sprayer 15 to the vehicle 20.

Exemplarily, the trailed agricultural sprayer 15 includes a fluid dispensing apparatus 45. The fluid dispensing apparatus 45 is in communication with a hydraulically-driven pump 50. The fluid dispensing apparatus 45 is configured to receive a fluid from the hydraulically-driven pump 50 and dispense the fluid.

The hydraulically-driven pump 50 moves the fluid at an actual fluid rate. The illustrated hydraulically-driven pump 50 is a centrifugal pump 55 that may be self-priming. Other types of pumps with hydraulic flow rate control are contemplated by this disclosure.

Figure 2:
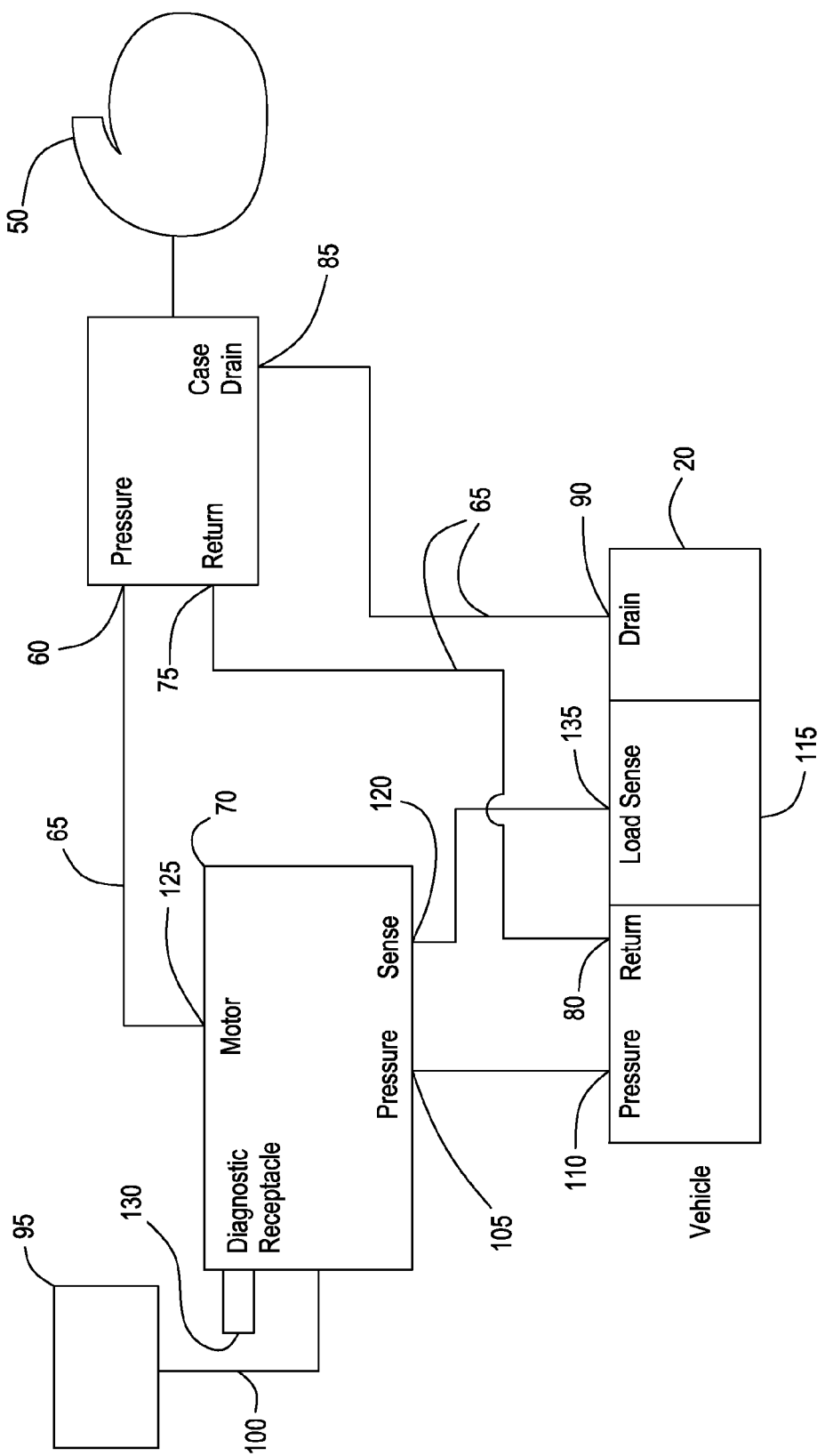
FIG. 2 is schematic of a portion of portion of the trailed agricultural implement shown in FIG. 1.

With reference to FIG. 2, the hydraulically-driven pump 50 includes a pump pressure input 60. The pump pressure input 60 receives a hydraulic fluid 65 from an electro-hydraulic valve 70. The hydraulically-driven pump 50 includes a pump return output 75. The pump return output 75 returns hydraulic fluid 65 to a vehicle return input 80 of the vehicle 20. The hydraulically-driven pump 50 may include a pump case drain 85. The pump case drain 85 returns hydraulic fluid 65 to a vehicle drain input 90 of the vehicle 20 at little to no pressure.

A controller 95 is configured to determine the actual fluid rate. The controller 95 communicates with the electro-hydraulic valve 70 to adjust the actual fluid rate to correspond to a desired flow rate. The controller 95 may communicate through a wired connection 100 or a wireless connection.

The electro-hydraulic valve 70 is configured to receive a vehicle hydraulic pressure. The electro-hydraulic valve 70 includes a valve pressure input 105 that receives the vehicle hydraulic pressure from a vehicle pressure output 110 of the vehicle 20. The electro-hydraulic valve 70 communicates with a vehicle load sense system 115 via a valve sense output 120. The electro-hydraulic valve 70 provides hydraulic fluid 65 to the hydraulically-driven pump 50 via a valve motor output 125. Exemplarily, the electro-hydraulic valve 70 may include a diagnostic receptacle 130. The diagnostic receptacle 130 provides a test port for service work.

The vehicle load sense system 115 includes a vehicle sense input 135. The vehicle load sense system 115 senses en implement hydraulic pressure and communicates with a vehicle hydraulic pump. The vehicle hydraulic pump adjusts the vehicle hydraulic pressure to correspond to the implement hydraulic pressure. This reduces the possibility that the vehicle will overheat.

In operation, the coupling mechanism 45 of the agricultural implement 10 is coupled to the vehicle 20. The agricultural implement 10 is pulled by the vehicle 20 over the surface 35. The controller 95 receives the desired fluid rate and determines the actual fluid rate. The controller 95 communicates with the electro-hydraulic valve 70 to correspond the actual fluid rate with the desired fluid rate. The electro-hydraulic valve 70 receives the vehicle hydraulic pressure. The electro-hydraulic valve 70 regulates the vehicle hydraulic pressure to the implement hydraulic pressure that is provided to the hydraulically-driven pump 50. This adjusts the actual fluid rate to correspond to the desired fluid rate, in the illustrated embodiment, the actual fluid rate may change from a minimum flow rate to a maximum flow rate in less than or equal to three seconds The electro-hydraulic valve 70 communicates the implement hydraulic pressure to the vehicle load sense system 115. The vehicle load sense system 115 communicates with the vehicle hydraulic pump that adjusts the vehicle hydraulic pressure to correspond to the implement hydraulic pressure. This prevents the vehicle hydraulic pump from pumping more hydraulic fluid than what is needed. This also helps to reduce overheating of the vehicle and to conserve energy.

Various features are set forth in the following claims.

What is claimed is:

1. A trailed agricultural sprayer comprising:
a hydraulically-driven pump for moving a fluid at an actual fluid rate; and
an electro-hydraulic valve configured to regulate an implement hydraulic pressure to the hydraulically-driven pump that regulates the actual fluid rate;
wherein the electro-hydraulic valve is configured to receive a vehicle hydraulic pressure and communicate with a vehicle load sense system that senses the implement hydraulic pressure and communicates with a vehicle hydraulic pump that adjusts the vehicle hydraulic pressure to correspond to the implement hydraulic pressure.

2. The trailed agricultural sprayer of claim 1, further comprising a controller configured to determine the actual fluid rate and communicate with the electro-hydraulic valve to adjust the actual fluid rate to correspond to a desired flow rate.

3. The trailed agricultural sprayer of claim 1, further comprising a frame configured to support the hydraulically-driven pump.

4. The trailed agricultural sprayer of claim 3, further comprising a coupling mechanism coupleable to the frame, the coupling mechanism for coupling to a vehicle.

5. The trailed agricultural sprayer of claim 3, further comprising a plurality of wheel assemblies coupleable to the frame, the wheel assemblies supporting the frame above a surface.

6. The trailed agricultural sprayer of claim 1, further comprising a fluid dispensing apparatus in communication with the hydraulically-driven pump and configured to dispense the fluid.

7. The trailed agricultural sprayer of claim 1, wherein the hydraulically-driven pump is a centrifugal pump.

8. The trailed agricultural sprayer of claim 1, wherein the hydraulically-driven pump is a self-priming pump.

9. A trailed agricultural implement comprising:
a hydraulically-driven pump for moving a fluid at an actual fluid rate; and
an electro-hydraulic valve configured to regulate an implement hydraulic pressure to the hydraulically-driven pump that regulates the actual fluid rate;
wherein the electro-hydraulic valve is configured to receive a vehicle hydraulic pressure and communicate with a vehicle load sense system that senses the implement hydraulic pressure and communicates with a vehicle hydraulic pump that adjusts the vehicle hydraulic pressure to correspond to the implement hydraulic pressure.

10. The trailed agricultural implement of claim 9, further comprising a controller configured to determine the actual fluid rate and communicate with the electro-hydraulic valve to adjust the actual fluid rate to correspond to a desired flow rate, 11. The trailed agricultural implement of claim 9, further comprising a frame configured to support the hydraulically-driven pump.

12. The trailed agricultural implement of claim 11, further comprising a coupling mechanism coupleable to the frame, the coupling mechanism for coupling to a vehicle.

13. The trailed agricultural implement of claim 11, further comprising a plurality of wheel assemblies coupleable to the frame, the wheel assemblies supporting the frame above a surface.

14. The trailed agricultural implement of claim 9, wherein the hydraulically-driven pump is a centrifugal pump.

15. The trailed agricultural implement of claim 9, wherein the hydraulically-driven pump is a self-priming pump.

16. A method for operating a hydraulically-driven pump to move a fluid on a trailed agricultural implement, the method comprising:
receiving a desired fluid rate;
determining an actual fluid rate;
receiving a vehicle hydraulic pressure;
regulating the vehicle hydraulic pressure to an implement hydraulic pressure provided to the hydraulically-driven pump to adjust the actual fluid rate to correspond to the desired fluid rate; and
communicating the implement hydraulic pressure to a vehicle load sense system that communicates with a vehicle hydraulic pump that adjusts the vehicle hydraulic pressure to correspond to the implement hydraulic pressure.

17. The method of claim 16, further comprising changing the actual fluid flow rate from a minimum flow rate to a maximum flow rate in less than or equal to three seconds.

18. The method of claim 16, further comprising providing a frame configured to support the hydraulically-driven pump.

19. The method of claim 16, further comprising providing a fluid dispensing apparatus in communication with the hydraulically-driven pump, the fluid dispensing apparatus configured to dispense the fluid.

20. The method of claim 16, wherein the hydraulically-driven pump is a centrifugal pump.

* * * * *